(12) United States Patent
Cho et al.

(10) Patent No.: US 12,225,061 B1
(45) Date of Patent: Feb. 11, 2025

(54) SYSTEM AND METHOD FOR EPHEMERAL ASSIGNMENT OF NETWORK SLICES

(71) Applicant: Verizon Patent and Licensing Inc., Basking Ridge, NJ (US)

(72) Inventors: Jae Cho, Demarest, NJ (US); Jeremy Short, Glen Gardner, NJ (US); Lily Zhu, Parsippany, NJ (US); Paul Kania, Branchburg, NJ (US); Rachel Elizabeth Page, Mine Hill Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 18/366,070

(22) Filed: Aug. 7, 2023

(51) Int. Cl.
*H04L 65/1069* (2022.01)
*H04L 65/1073* (2022.01)

(52) U.S. Cl.
CPC ...... *H04L 65/1069* (2013.01); *H04L 65/1073* (2013.01)

(58) Field of Classification Search
CPC .................. H04L 65/1069; H04L 65/1073
See application file for complete search history.

(56) References Cited

U.S. PATENT DOCUMENTS

| 2019/0182875 | A1* | 6/2019 | Talebi Fard | ......... H04W 76/11 |
| 2023/0141745 | A1* | 5/2023 | Lee | ....................... H04W 48/18 |
| | | | | 370/329 |
| 2023/0412608 | A1* | 12/2023 | Vaishnavi | ............. H04L 63/102 |
| 2023/0422142 | A1* | 12/2023 | Vakeesar | ............... H04W 40/20 |

* cited by examiner

*Primary Examiner* — Adnan M Mirza (57) ABSTRACT

A device may include a processor. The processor may be configured to: send an enlistment request to a network over a wireless connection, wherein the enlistment request includes an application identifier (ID) corresponding to an application to be enlisted; receive a reply from the network in response to the enlistment request, wherein the reply includes a replacement User Equipment Route Selection Policy (URSP) rule; receive a session request from the application to establish a session; identify, in response to the session request and based on the replacement URSP rule, a network slice on the network; and establish the session between the application and the identified network slice on the network.

20 Claims, 11 Drawing Sheets

SYSTEM AND METHOD FOR EPHEMERAL ASSIGNMENT OF NETWORK SLICES

BACKGROUND INFORMATION

Fifth Generation (5G) networks offer many new technological features unavailable in predecessor networks. For example, through use of network slicing, 5G networks may provide application and subscriber-specific Quality-of-Service (QoS) services for variety of applications. Other benefits of network slicing may include improved network resource utilization, faster rollout times for new services without significant modifications to the existing network infrastructure, and increased security. Network slicing may take a more prominent role in 5G as operations of Internet-of-Things (IoT) devices, such as autonomous vehicles or sensor devices, require greater connectivity and increased online presence.

DETAILED DESCRIPTION

The following detailed description refers to the accompanying drawings. The same reference numbers in different drawings may identify the same or similar elements. As used herein, the terms "service provider" and "provider network" may refer to, respectively, a provider of communication services and a network operated by the service provider.

As used herein, the term "session" may refer to a communication channel, of a limited duration, between two endpoints (e.g., two applications). It is understood that when a session is said to be established between an application and a network slice, that the session is established between the application and another application on the network slice. Similarly, it is understood that if a session is said to be established between a device and a network slice or a network, the session is established between an application on the device and another application on either the network slice or the network. When an application establishes a session with a network or a network slice, it is understood that the session is established between the application and the network or the network slice.

As used herein, the term Protocol Data Unit (PDU) session may refer to a communication channel between a mobile device and another endpoint (e.g., a data network). Depending on the context, the term "session" may refer to a session between applications or a PDU session. Additionally, depending on the context, the term "connection" may refer to a session, a PDU session, or another type of connection (e.g., a radio frequency link between a device and a base station).

Figure 1:
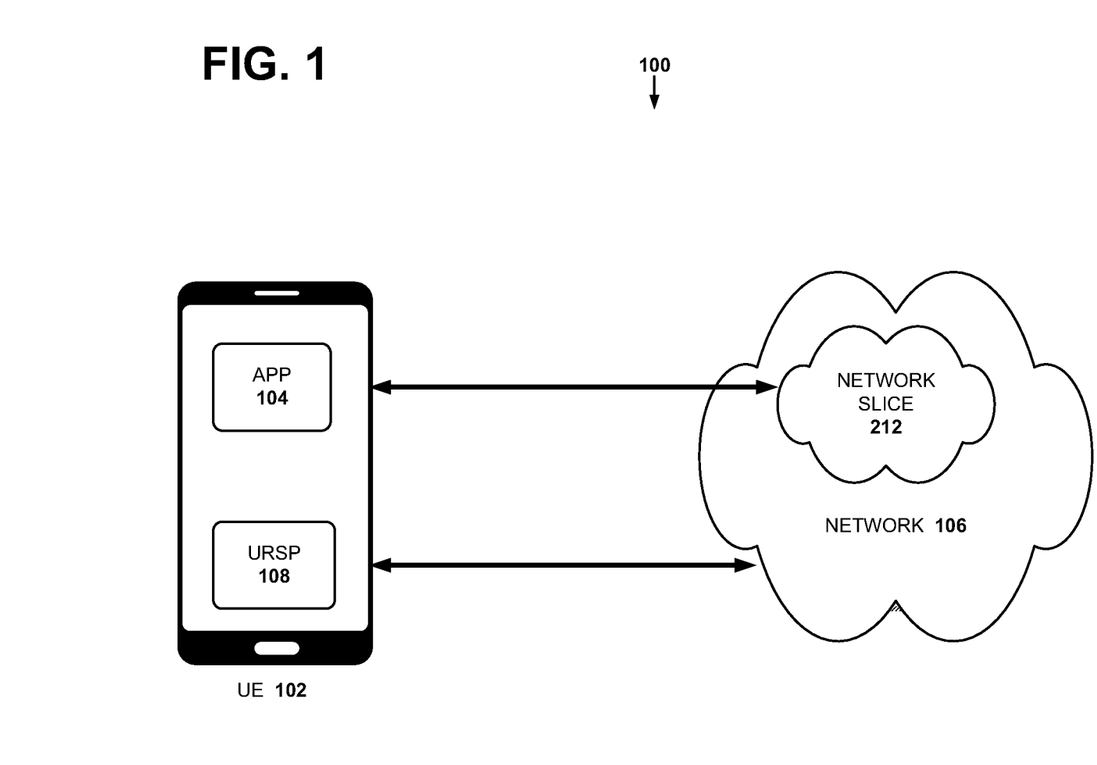
FIG. 1 illustrates an overview of a system for ephemeral assignment of network slices.

Systems and methods described herein relate to ephemeral assignment (e.g., a short-lived or a temporary assignment) of network slices. FIG. 1 illustrates an overview of a system 100 for ephemeral assignment of network slices. As shown, a User Equipment device (UE) 102 includes at least one application 104 (app 104). When launched, application 104 may cause UE 102 to set up a wireless link with provider network 106 so that application 104 can communicate with network slice 212. For UE 102 to enable application 104 to establish a session with network slice 212, UE 102 may look up rules, herein referred to as UE Route Selection Policy (URSP) rules 108 (also referred to as URSP 108), to select a route to network slice 212. That is, by using URSP 108, UE 102 may select a communication path between application 104 and network slice 212.

In many implementations, when application 104 requests UE 102 (or more precisely, components within UE 102 responsible for handling lower layers of telecommunication) to set up a connection to network 106 for application 104, application 104 may pass to UE 102 only limited information, such as a traffic descriptor (e.g., a piece of information which indicates a type of traffic that application 104 may exchange with network slice 212), UE 102 may then use the traffic descriptor to look up, in URSP 108, a URSP rule to identify the network slice 212 to which application 104 will establish a session. Application 104 may not pass other application-specific information to UE 102 due to, for example, security restrictions that the operating system of UE 102 imposes on application 104. Accordingly, if the traffic descriptor is not correct or URSP 108 is not up to date (e.g., URSP 108 does not include a URSP rule that maps the traffic descriptor to the correct network slice), UE 102 may identify a wrong network slice for application 104.

The systems and methods described herein address the above-described issue, i.e., UE 102 connecting to a network slice 212 for application 104 that doesn't address the needs of application 104, because the operating system of UE 102 permits application 104 to pass only limited information to UE 102. According to an implementation, when application 104 launches, a client program (or application 104 itself) may contact network 106 via an out-of-band communication and send a request to enlist application 104 with network 106. The enlistment request may include, for example, a traffic descriptor, a desired level of QoS (e.g., a 5G QoS Identifier (5QI) or a QoS Class Identifier (QCI)) for UE 102/application 104, and/or other application-specific information. When network 106 receives the request, network 106 obtains a URSP rule that temporarily maps the traffic descriptor to a network slice 212 that will render the desired QoS to application 104. When network 106 forwards the URSP rule to UE 102, UE 102 may store the URSP rule in URSP 108.

After the enlistment, application 106 may request UE 102 to set up a connection with network slice 212, passing UE 102 its traffic descriptor or the replacement traffic descriptor. Because URSP 108 has been updated with the correct URSP rule, UE 102 is able to find, using the traffic descriptor, the URSP rule in URSP 108 and identify the associated network slice 212. Application 104 may then establish a session with network slice 212 to receive its services. When application 104 is about to terminate, the client program in UE 102 (or application 104 itself) may send a request to network 106 to de-enlist application 104. In response, network 106 may de-enlist application 106 and forward a message to UE 102, instructing UE 102 to restore URSP 108 to its state prior to the enlistment of application 104 at network 106. Thus, network 106 ends its temporary assignment of network slice 212 to application 104.

Figure 2:
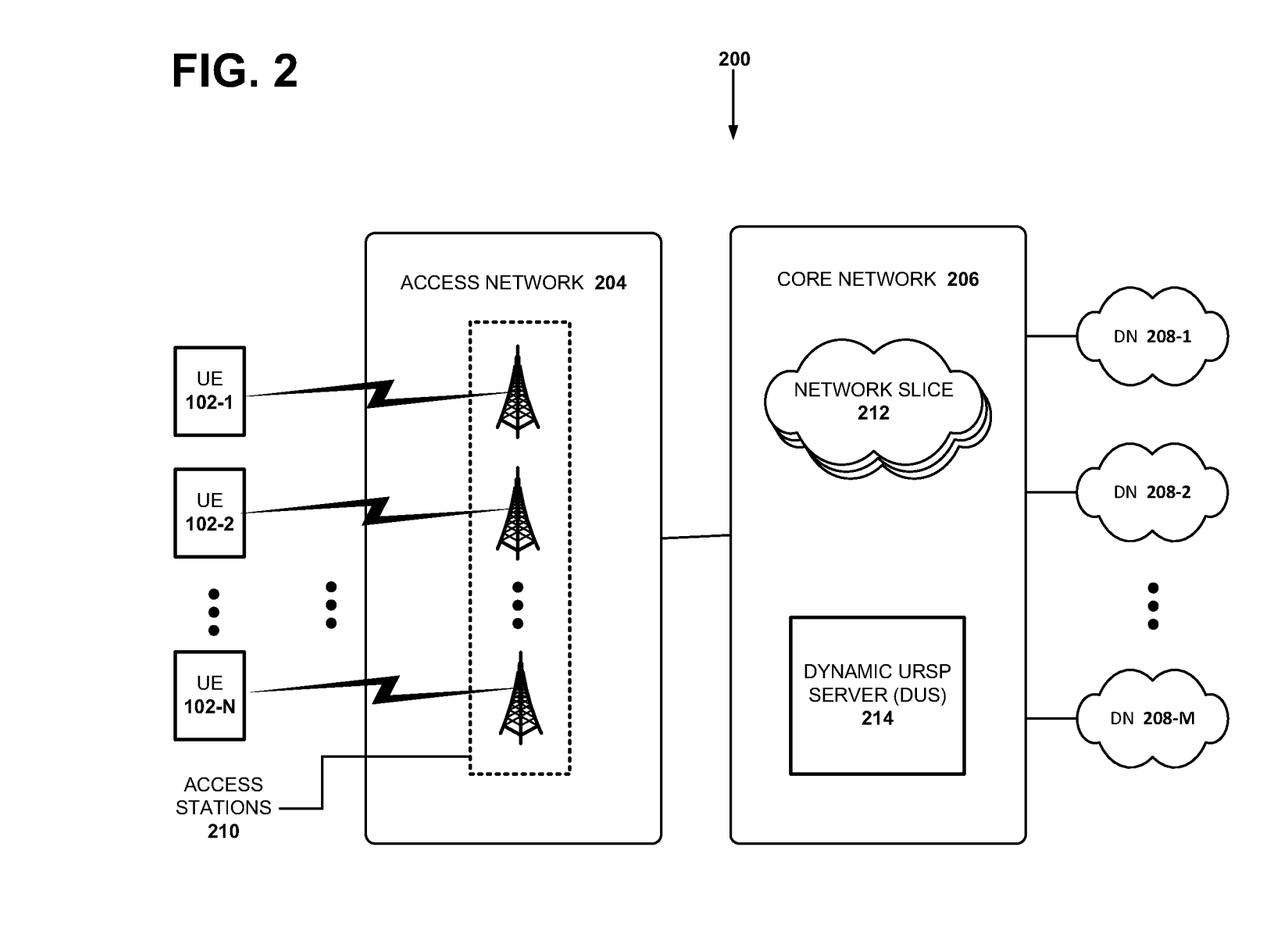
FIG. 2 illustrates an exemplary network in which systems and methods described herein may be implemented.

FIG. 2 illustrates an exemplary network environment 200 in which the system and methods may be implemented. As shown, environment 200 may include UEs 102-1 through 102-N (collectively referred to as UEs 102 and generically referred to as UE 102), access network 204, core network 206, and data networks (DNs) 208-1 through 208-M (collectively referred to as data networks 208 and generically as data network 208). Access network 204, core network 206, and data networks 208 may be part of network 106 (shown in FIG. 1 but not shown in FIG. 2).

UEs 102 may include wireless communication devices capable of Fifth Generation (5G) New Radio (NR) communication. Some UEs 102 may include Fourth Generation (4G) (e.g., Long-Term Evolution (LTE)) communication capabilities or a combination of 5G and 4G communication capabilities (e.g., Evolved-Universal Terrestrial Radio Access-New Radio-Dual connectivity (EN-DC) capability). Examples of UE 102 include: a Fixed Wireless Access (FWA) device; a Customer Premises Equipment (CPE) device; a smart phone; a tablet device; a wearable computer device (e.g., a smart watch); a global positioning system (GPS) device; a laptop computer; a media playing device; a portable gaming system; an autonomous vehicle navigation system; a sensor, such as a pressure sensor or; and an Internet-of-Things (IoT) device. In some implementations, UE 102 may correspond to a wireless Machine-Type-Communication (MTC) device that communicates with other devices over a machine-to-machine (M2M) interface, such as LTE-M or Category M1 (CAT-M1) devices and Narrow Band (NB)-IoT devices.

Each UE 102 may include one or more applications that receive services from one or more network slices 212. In addition, UE 102 may include an application or a software component that communicates with network 106 to enlist the application with network 106 and to receive a replacement URSP rule. The application or the software component may also de-enlist the application with network 106 when the application is about to terminate or end its session with a network slice 212. In some implementations, the application may obtain from network 106 a new traffic descriptor, which the application may pass to the lower layers of UE 102 when requesting UE 102 to connect to a network slice 212.

Access network 204 may allow UEs 102 to access core network 206. To do so, access network 204 may establish and maintain, with participation from UEs 102, an over-the-air channel with UEs 102; and maintain backhaul channels with core network 206. Access network 204 may relay information through such channels, from UEs 102 to core network 206 and vice versa. Access network 204 may include an LTE radio network and/or a 5G NR network, or another advanced radio network. These networks may include many central units (CUs), distributed units (DUs), radio units (RUs), and wireless stations, some of which are illustrated in FIG. 2 as access stations 210, for establishing and maintaining over-the-air channel with UEs 102. In some implementations, access station 210 may include a 4G, 5G, or another type of base station (e.g., eNB, gNB, etc.) that comprises one or more radio frequency (RF) transceivers. In some implementations, access station 210 may be part of an evolved Universal Mobile Telecommunications Service (UMTS) Terrestrial Radio Access Network (eUTRAN).

Core network 206 may include one or more devices and network components for providing communication services to UEs 102. For example, core network 206 may permit UEs 102 to attach to network 106, establish sessions with devices in network 106, and/or receive services from network 106 (e.g., receive content, access the Internet, conduct video conferences with other UEs 102 attached to network 106). To deliver various services, core network 206 may interface with other networks, such as data networks 208. To render these services and to perform the core functions of network 106, core network 206 may include 5G core network components or 4G (e.g., LTE) core network components. Some of the 5G core network components, herein referred to as network functions (NFs), are described below with reference to FIG. 7.

As further shown, core network 206 may include one or more network slices 212. Depending on the implementation, network slices 212 may be implemented within other networks, such as access network 204 and/or data network 208. Access network 204, core network 206, and data networks 208 may include multiple instances of network slices 212. Each network slice 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated storage and/or computational resources that include access network components, clouds, transport components, Central Processing Unit (CPU) cycles, memory, etc. Furthermore, each network slice 212 may be configured to meet a different set of requirements and may be associated with a particular QoS Class Identifier (QCI), 5G QoS Identifier (5QI), and/or a particular group of enterprise customers associated with communication devices. Network slices 212 may be capable of supporting enhanced Mobile Broadband (eMBB) traffic, Ultra Reliable Low Latency Communication (URLLC) traffic, Time Sensitive Network (TSN) traffic, Massive IoT (MIoT) traffic, Vehicle-to-Everything (V2X) traffic, High performance Machine Type Communication (HMTC) traffic, and other customized traffic, for example.

Each network slice 212 may be associated with an identifier, herein referred to as a Single Network Slice Selection Assistance Information (S-NSSAI) and/or a network slice instance ID. Each UE 102 that is configured to access a particular network slice may be associated with corresponding subscription data or a subscription profile, stored in core network 206 for example, that includes the S-NSSAI corresponding to the network slice 212.

As further shown, core network 206 may include a Dynamic URSP server (DUS) 214. DUS 214 may receive a request from UE 102 to enlist an application, de-enlist the application, determine a URSP rule for the application based on the request, forward the URSP rule to UE 102 in response to the enlistment request, and/or forward an instruction to UE 102 to have URSP 108 revert to its state prior to the enlistment. DUS 214 is described below in greater detail with reference to FIGS. 5 and 6.

Data networks 208 may include one or more networks connected to core network 206. In some implementations, a particular data network 208 may be associated with a data network name (DNN) in 5G and/or an Access Point Name (APN) in 4G. UE 102 may request a connection to data network 208 using a DNN or APN. Each data network 208 may include and/or be connected to a local area network (LAN), a wide area network (WAN), a metropolitan area network (MAN), an autonomous system (AS) on the Internet, an optical network, a cable television network, a satellite network, another wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, or a combination of networks. Data network 208 may include an application server (also referred to as application). An application may provide services for a program or an application running on UEs 102 and may establish communication sessions with UEs 102 via core network 206.

For clarity, FIG. 2 does not show all components that may be included in network environment 200 (e.g., routers, bridges, wireless access point, additional networks, additional access stations 210, data centers, portals, etc.). Depending on the implementation, network environment 200 may include additional, fewer, different, or a different arrangement of components than those illustrated in FIG. 2. Furthermore, in different implementations, the configuration of network environment 200 may be different.

Figure 3:
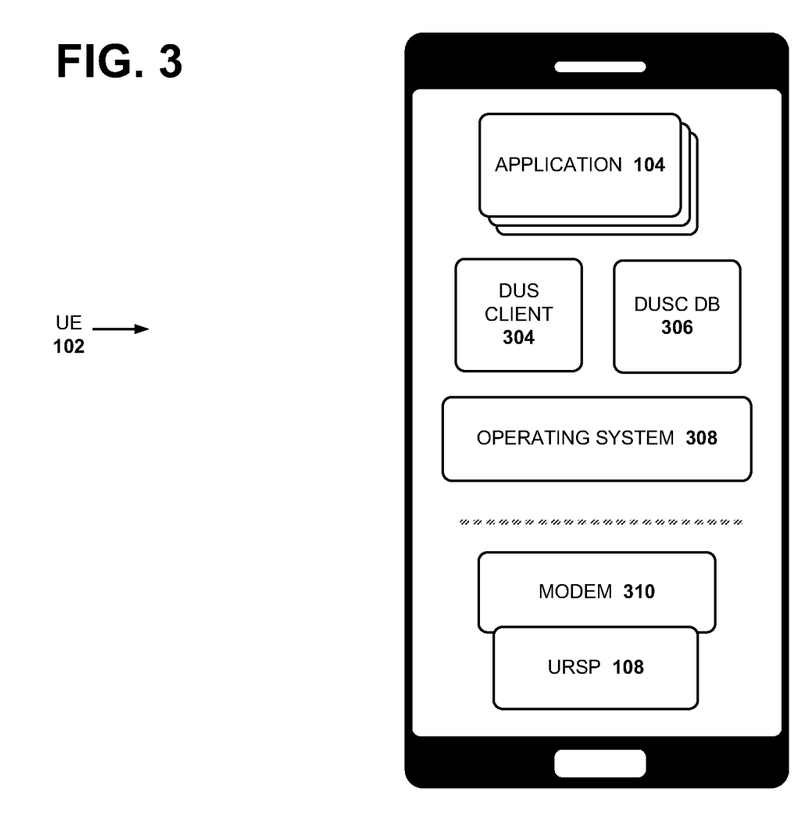
FIG. 3 depicts example components of a User Equipment device (UE) according to an implementation.

FIG. 3 depicts example components of a UE 102 according to an implementation. As shown, UE 102 may include one or more of application 104, a client 304 (a client to DUS 214), DUS client database 306 (DUSC DB 306), an operating system 308, a modem 310, and a URSP 108. Depending on the implementation, UE 102 may comprise other components or different components than those illustrated in FIG. 3.

Application 104 may include one or more software programs that run on UE 102. Application 104 may operate in conjunction with another program, also referred to as an application, in network 106, network slice 212, or data network 208. Application 104 may include or be associated with an application ID and/or a traffic descriptor. A traffic descriptor may include identifier. A traffic descriptor indicates a type of traffic that application 104 may exchange over a connection that it establishes with network slice 212 or data network 208 (e.g., a video stream, an audio stream, Internet traffic, etc.). A traffic descriptor may include a fully qualified domain name (FQDN), a DNN, or another alphanumeric string.

Client 304 may provide a mechanism for enlisting application 104 and de-enlisting application 104 with network 106. In many implementations, the functionalities of client 304 may be included in application 104. In such implementations, application 104 may perform the functions of client 304. When in operation, after application 104 launches, client 304 may make a request to DUS 214 on network 106, to enlist application 104. To make the request, client 304 may invoke an application programming interface (API) call to lower layers of the communication system in UE 102, passing the traffic descriptor of application 104 through operating system 308 to modem 310. Any acknowledgment or a response from DUS 214 in network 106 may arrive at modem 310 and flow through operating system 308 to client 304.

Once application 203 is enlisted at network 106 and UE 102 has been given a URSP rule that maps a network slice 212 to the traffic descriptor, application 104 may start a session with network slice 212, by requesting UE 102 to establish a connection with the network slice 212. When application 104 no longer wishes to use the network slice 212 or is about to exit (e.g., terminate), client 304 may forward a request to de-enlist application 104 to DUS 214. In order for client 304 to connect to DUS 214 so that client 304 can send an enlistment request or a de-enlistment request, client 304 may be pre-configured with a network address (e.g., DNN), its own app ID, an APN, or a network slice ID associated with DUS 214.

Figure 4:
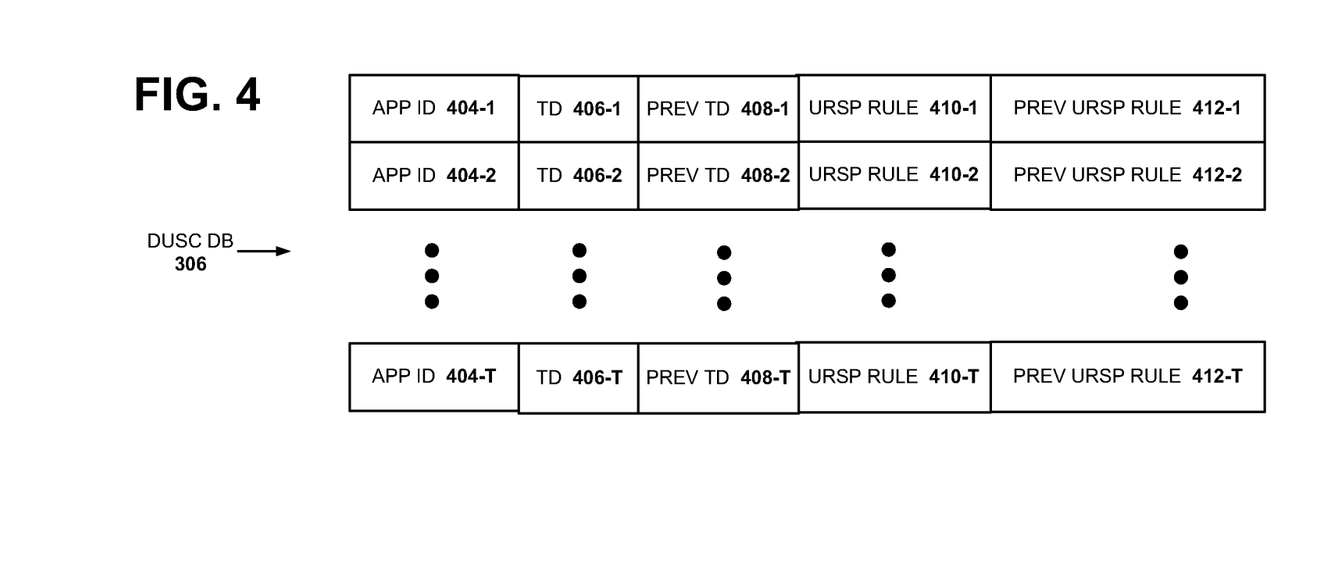
FIG. 4 illustrates example fields of records in a Dynamic UE Route Selection Policy Client (DUSC) database (DB), according to an implementation.

When client 304 attempts to enlist application 104 or de-enlist application 104 with network 106, client 304 may make use of DUSC DB 306. More specifically, DUSC DB 306 may include information that client 304 sends to or receives from DUS 214 during the enlistment or de-enlistment process. FIG. 4 illustrates example fields of records in DUSC DB 306. As shown, each row in DUSC DB 406 corresponds to a record, which in turn may include an application ID field 404, a traffic descriptor (TD) field 406, a previous TD field 408, a URSP rule field 410, and a previous URSP rule field 412. Depending on the implementation, each of the records may include additional, fewer, or different fields than those illustrated in FIG. 4.

Application ID field 404 may include an identifier that is associated with application 104. Client 304 may store the application ID of application 104 in field 404 when application 104 launches—unless the application ID is already stored in DUSC DB 306 (e.g., due to a prior launch of application 104). TD field 406 may include a replacement traffic descriptor that DUS 214 may provide to UE 102. DUS 214 may or may not provide a replacement traffic descriptor, depending on the implementation. If DUS 214 does not provide a replacement traffic descriptor, TD field 406 may be left blank.

Previous TD field 408 may include the initial traffic descriptor for application 104. URSP rule field 410 may include a replacement URSP rule that DUS 214 may provide to client 304 when client 304 enlists application 104 with DUS 214. If DUS 214 does not provide a replacement URSP rule to client 304, URSP rule field 410 may be left blank. Previous URSP rule 412 may include a URSP rule that client 304 may look up in URSP 108, by using the previous traffic descriptor as a key.

For each record in DUSC DB 306, client 304 may receive data for TD field 406 and URSP field 410 for application 104 from DUS 214 in response to the enlistment request from client 304. After client 304 receives the data from DUS 214, client 304 may update URSP 108 with the replacement URSP rule received from DUS 214. Client 304 may also write the data in fields 406 and 410 in DUSC DB 306. If DUS 214 does not provide a replacement traffic descriptor, client 304 may leave field 406 blank. If DUS 214 does not provide a URSP rule, client 304 may not update URSP 108*e* and leave field 410 blank.

For application ID field 404, previous TD field 408, and/or previous URSP rule field 412, client 304 may obtain the corresponding data from application 104, URSP 108, and/or operating system 308 and write the obtained data in fields 404, 408, and 412. During de-enlistment of application 104, client 304 may use the data in previous URSP rule field 412 and URSP rule field 410 to restore URSP 108 to its state prior to the enlistment of application 104 at network 106.

Referring back to FIG. 3, operating system 308 may manage applications 104, services, memory, and/or other resources on UE 102. Additionally, as indicated above, operating system 308 may relay connection requests from application 104 and/or client 304 to modem 310 and relay messages that arrive at modem 310 from network 106 to application 104 or client 304. Operating system 308 may enforce a number of security requirements and prevent application 104 from passing application-specific information to other components in UE 102, such as modem 310.

Modem 310 may perform communication-related functions, including establishing connections between UE 102 and network 106, delivering messages from/to UE 102 to/from network 106, performing modulation/demodulation, performing signal processing, etc. When modem 310 receives a connection request from application 104 or client 304 via operating system 308, modem 310 may extract a traffic descriptor from the request. Modem 310 may then look up, using the traffic descriptor, a URSP rule in URSP 108 and apply the URSP rule to obtain the identity of the network slice 212 or a data network 208 with which application 104 or client 304 is to establish a session. Thereafter, modem 310 may establish the connection to the identified network slice 212 or the identified data network 208.

URSP 108 may include URSP rules. When network 106 sends a replacement URSP rule to UE 102 (e.g., to client 304 during the enlistment of application 104), modem 310 may store the replacement URSP rule in URSP 108. Furthermore, modem 310 may access URSP 108 when modem 310 looks up a URSP rule whose traffic descriptor matches the traffic descriptor in the connection request received by modem 310 from application 104 or client 304. URSP 108 may be hosted on a persistent storage within UE 102, such as for example, embedded Subscriber Identity Module (SIM).

Figure 5:
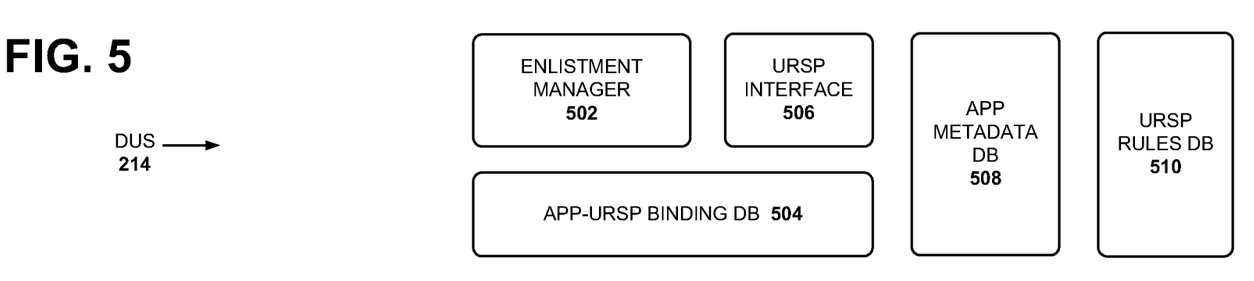
FIG. 5 illustrates an example Dynamic UE Route Selection Policy (URSP) server, (DUS) according to an implementation.

FIG. 5 illustrates example components of DUS 214, according to an implementation. As shown, DUS 214 may include an enlistment manager 502, an app-URSP binding DB 504 that includes client records, a URSP interface 506, an app metadata DB 508, and a URSP rules DB 510. Depending on the implementation, DUS 214 may include additional, fewer, different, or a different arrangement of components than those illustrated in FIG. 5.

Enlistment manager 502 may enlist applications 104 of UEs 102 in response to receiving enlistment requests from the client 304. When enlistment manager 502 receives an enlistment request from client 304, enlistment manager 502 may create a new record for the UE 102 and insert the records in app-URSP binding DB 504. When enlistment manager 502 receives a request to de-enlist application 104, depending on the implementation, enlistment manager 502 may or may not remove data corresponding to application 104 when enlistment manager 502.

Figure 6:
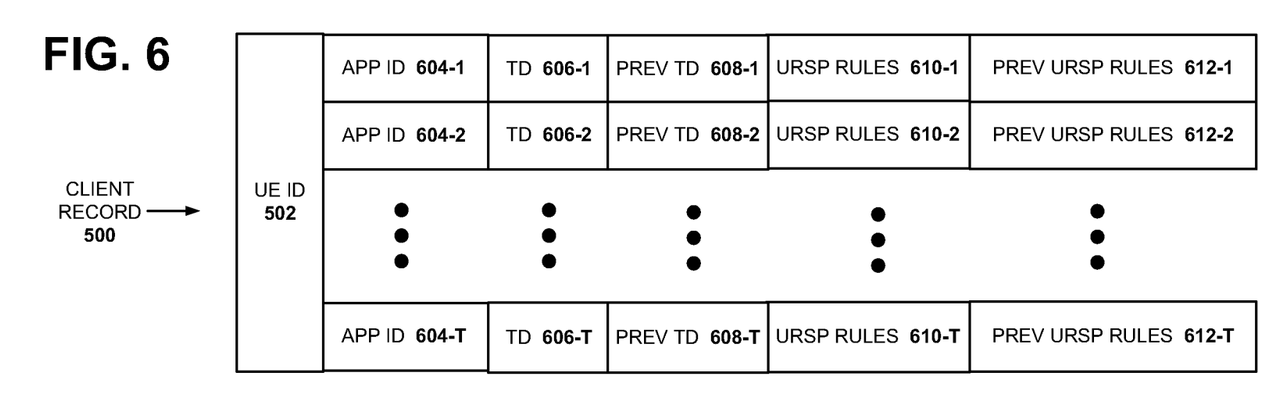
FIG. 6 depicts example fields of a record in an app-UE binding database (DB), according to an implementation.

FIG. 6 depicts example fields of a record in app-URSP binding DB 504, according to an implementation. As shown in FIG. 6, client record 600 may include a UE ID field 602, app ID fields 604-1 through 604-T, TD fields 606-1 through 606-T, previous TD fields 608-1 through 608-T, URSP fields 610-1 through 610-T, and previous URSP fields 612-1 through 612-T. Depending on the implementation, UE record 600 may include additional, fewer, different, or a different arrangement of fields than those illustrated in FIG. 6.

UE ID field 602 may store an ID of UE 102 which is the host of the client 304 requesting DUS 214 to enlist application 104. Examples of a UE ID include a Subscription Permanent Identifier (SUPI), a Subscription Concealed Identifier (SUCI), an International Mobile Subscriber Identity (IMSI), and a Mobile Station International Subscriber Directory Number (MSISDN). App ID fields 604 may store the IDs of applications 104 on the UE 102. TD fields 606 may store replacement traffic descriptors of applications 104. When enlistment manager 502 in DUS 214 receives an enlistment request for application 104 from client 304 on UE 102, DUS 214 may access information pertaining to UE 102 (e.g., subscription profile) in a network function within core network 206 and use the information to identify the network slice 212 to which application 104 may connect. Furthermore, enlistment manager 502 may generate or obtain a replacement traffic descriptor and/or a replacement URSP rule that maps the replacement traffic descriptor to the ID of the network slice 212. Enlistment manager 502 may insert the replacement traffic descriptor and the replacement URSP rule into TD field 606 and URSP field 610. Previous TD field 608 may store the traffic descriptor, of application 104, in the enlistment request. Previous URSP rule field 612 may store the previous URSP rule for application 104. Enlistment manager 502 may obtain the previous URSP rule from the enlistment request or by using the received traffic descriptor to look up the previous URSP rule in URSP rules DB 510.

When enlistment manager 502 receives an enlistment request from client 304 on UE 102, enlistment manager 502 may attempt to forward the replacement URSP rule in URSP rule field 610 and/or the replacement traffic descriptor in traffic descriptor field 606 to client 304. Depending on the implementation and/or the use case, enlistment manager 502 may or may not be able to send the replacement URSP rule and/or the replacement traffic descriptor (e.g., when enlistment manager 502 is unable to obtain the replacement URSP rule or traffic descriptor) to client 304. Similarly, when enlistment manager 502 receives a de-enlistment request from client 304, enlistment manager 502 may forward a response to UE 102. The response may cause UE 102 to restore URSP 108 in UE 102 to its state prior to the enlistment. Depending on the implementation, the response may or may not include the previous URSP rule or the previous traffic descriptor.

Referring back to FIG. 5, URSP interface 606 may interact with various network functions in core network 206 to obtain URSP rules and store them in URSP rules DB 510. App metadata DB 508 may include metadata for applications 104. App metadata DB 508 may include, for example, application IDs, possible traffic descriptors for applications 104, desired levels of QoS for applications 104, etc. URSP rules DB 510 may store URSP rules.

Figure 7:
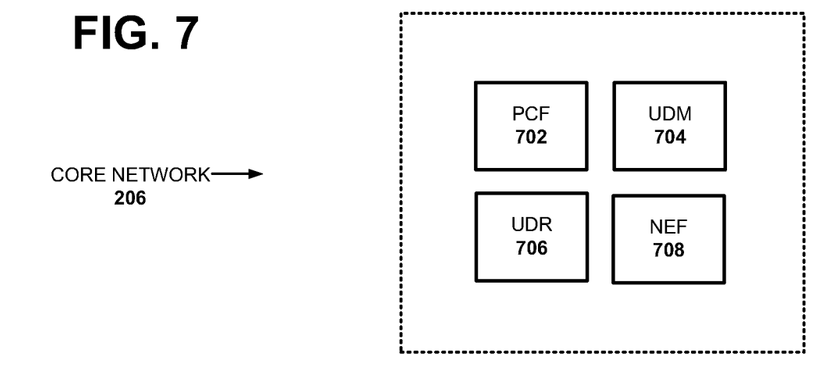
FIG. 7 shows example components of a core network, according to an implementation.

FIG. 7 shows example components of core network 206, according to an implementation. As shown, core network 206 may include a Policy Control Function (PCF) 702, a Unified Data Management (UDM) 704, a Unified Data Repository (UDR) 706, and a Network Exposure Function (NEF) 708. Although not shown, core network 206 may include other core network functions, such as, for example, an Access and Mobility Management Function (AMF), a Session Management Function (SMF), a user Plane Function (UPF), a Network Exposure Function (NEF), a Network Data Analytics Function (NWDAF), a charging function (CHF), a Network Repository Function (NRF), a Network Slice Selection Function (NSSF), and Authentication Server Function (AUSF).

PCF 702 may support policies to control network behavior, provide policy rules to control plane functions (e.g., to a SMF), access subscription information relevant to policy decisions, perform policy decisions, and/or perform other types of processes associated with policy enforcement. For the system for ephemeral assignment of network slices 212, PCF 702 may obtain a set of URSP rules for network slices 212 (e.g., generate them based on application types or receive them from network administrators), where each URSP rule specifies the slice ID of one of the network slices 212 and where each of the URSP rule comprises a traffic descriptor. Each URSP rule in the set may map a traffic descriptor to a slice ID of the network slice 212. When PCF 702 obtains the set of URSP rules, PCF 702 may send the set of URSP rules to UE 102 via an Over-the-Air server and/or to DUS 214. In response, UEs 102 and/or DUS 224 may store the URSP rules, respectively, in URSP 108 or URSP rules DB 510.

UDM 704 may maintain subscription information for UEs 102, manage subscriptions, generate authentication credentials, handle user identification, perform access authorization based on subscription data, perform network function registration management, maintain service and/or session continuity by maintaining assignment of an SMF for ongoing sessions, support Short Messaging Service (SMS) message delivery, support lawful intercept functionality, and/or perform other processes associated with managing user data. UDR 706 may store information that UDM 710 manages. Subscription information that UDM 704 manages (and stored in UDR 706) may include IDs of network applications that UE 102 may access and network slices 212 that UE 102 may be authorized to access.

NEF 708, as described above, may expose network component capabilities and events internal to corresponding core network 206 and/or data networks 208 to devices and network functions external to network 106. If DUS 214 is not implemented in core network 206 but in another network, such as an external network, DUS 214 may obtain information pertaining to network slices 212 or UEs 102 (e.g., stored in UDR 706) via NEF 708.

Figure 8:
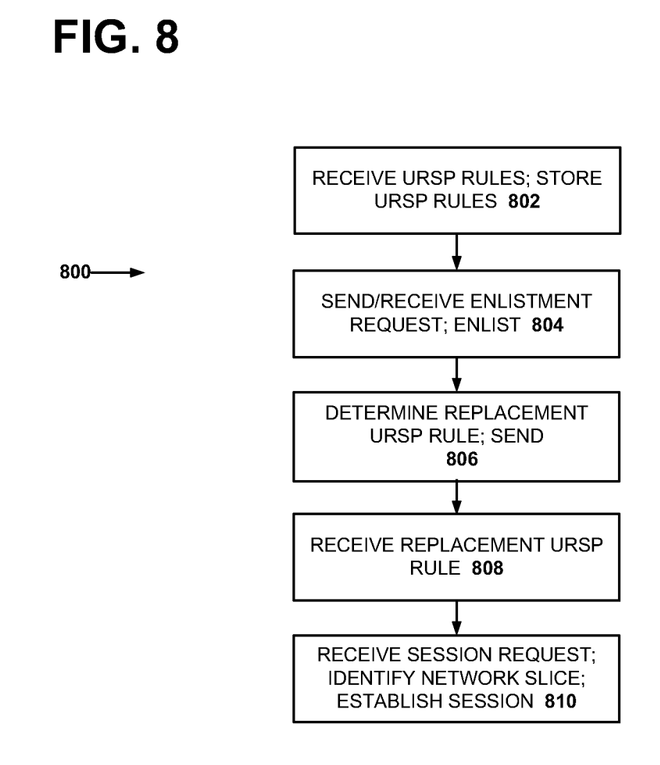
FIG. 8 is a flow diagram of an exemplary process that is associated with a system for ephemeral assignment of network slices, according to an implementation.
Figure 9:
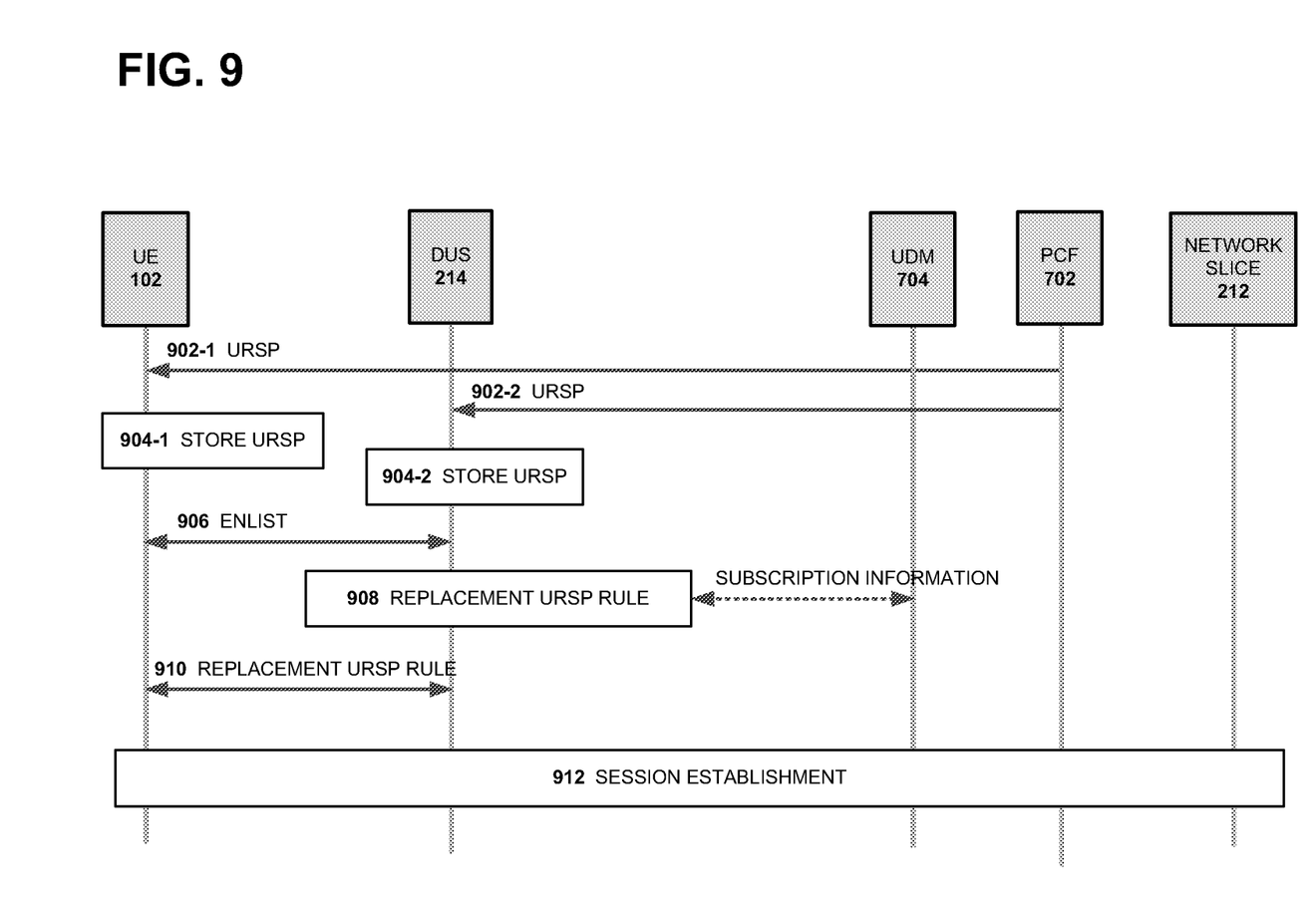
FIG. 9 illustrates example messages that are exchanged by a system for ephemeral assignment of network slices.

FIG. 8 is a flow diagram of an exemplary process 800 that is associated with ephemeral assignment of network slices and more particularly with enlisting application 104 at DUS 214. Process 800 may be performed by one or more components of the system, such as UE 102 (e.g., applications 104, client 304, DUSC DB 306, operating system 308, modem 310, and/or URSP 108), DUS 214, and/or core network 206 (e.g., network functions 702-708). FIG. 9 illustrates exemplary messages that are exchanged by components of the system during process 800.

As shown in FIG. 8, process 800 may include receiving updated URSP rules (block 802; arrows 902-1 and 902-2). For example, UE 102 and/or DUS 214 may receive the updated URSP rules. The destination network slice IDs specified by the updated URSP rules may include slice IDs of the network slices 212, of network 106, to which UEs 102 may connect. After the receipt of the updated URSP rules, UE 102 may store the received URSP rules in URSP 108 (block 802; block 904-1); and DUS 214 may store the URSP rules in URSP rules DB 510 (block 802; block 904-2).

Process 800 may further include client 304 sending a request to enlist application 104 to DUS 214 (block 804; arrow 906). The request may include a UE ID, an app ID for application 104, a TD, a 5QI or QCI of a service that application 104 needs from network 106, and/or a URSP rule which modem 310 may use for application 104. As described previously, when enlistment manager 502 in DUS 214 receives the enlistment request, enlistment manager 502 may create a corresponding client record 600 in app-URSP binding DB 504 or insert the information provided in the request in a pre-existing record associated with the UE ID.

Process 800 may further include determining a replacement URSP rule (block 806; block 908). For example, upon receiving the enlistment REQUEST from client 304, enlistment manager 502 may determine a replacement traffic descriptor and/or a replacement URSP rule that maps the replacement traffic descriptor to a correct network slice 212 for application 104. To perform this task, enlistment manager 502 may use the UE ID and the application ID to identify a correct network slice 212 for application 104. For example, enlistment manager 502 may contact UDM 704 to obtain the subscription profile associated with UE 102 and extract network slice-related information (e.g., IDs for a set of network slices that UE 102 may access) and use the application ID and/or the required QCI or 5QI for supporting application 104, to determine the correct network slice ID. Next, enlistment manager 502 may determine a URSP rule that maps the traffic descriptor provided in the enlistment request to the network slice ID. If no such URSP rule exists in URSP rules DB 510, enlistment manager 502 may generate a replacement URSP rule that maps the traffic descriptor to the network slice ID; or select a replacement traffic descriptor and find a replacement URSP rule in URSP rules DB 510 that maps the selected replacement traffic descriptor to the network slice. Enlistment manager 502 may insert the replacement traffic descriptor (if different from the traffic descriptor in the request from client 304) and/or the replacement URSP rule (if different from the URSP rule sent in the enlistment request) in app-URSP binding DB 504.

After the insertion, enlistment manager 502 may send the replacement URSP rule and/or replacement traffic descriptor to client 304 (block 806; arrow 910). If there is no replacement URSP rule and/or TD, enlistment manager 502 may send an indication that there are no replacement URSP rule and/or traffic descriptor.

Process 800 may further include receiving a reply that includes the replacement URSP rule and/or the replacement TD from DUS 214 (block 808). When client 304 on UE 102 receives the replacement URSP rule and/or the replacement TD, client 304 may store them in DUSC DB 306. Furthermore, client 304 may update the traffic descriptor of application 104 and may insert the replacement URSP rule in URSP 108.

After the enlistment, application 104 may request UE 102 to connect to network 106 (block 810; arrow 912); identify the network slice 212; and establish a session with the network slice (block 810). More specifically, application 104 may request, via operating system 308, UE 102 to set up the session. The request may include either the original traffic descriptor or the replacement traffic descriptor for application 104. When modem 310 receives the request (via operating system 308), modem 810 may use the traffic descriptor from application 104 to look up a URSP rule that maps the traffic descriptor to the correct network slice 212. Modem 310 may then use the rule to identify the network slice and establish a session from application 104 to the network slice 212.

Figure 10:
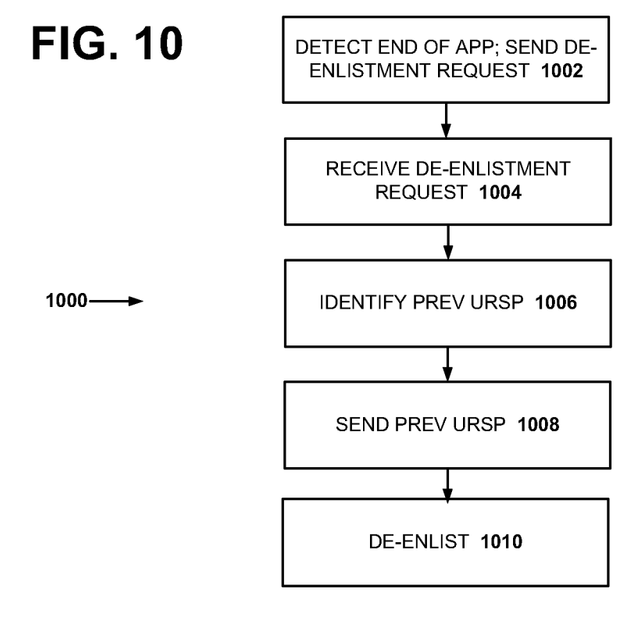
FIG. 10 is a flow diagram of another exemplary process that is associated with a system for ephemeral assignment of network slices, according to an implementation.
Figure 11:
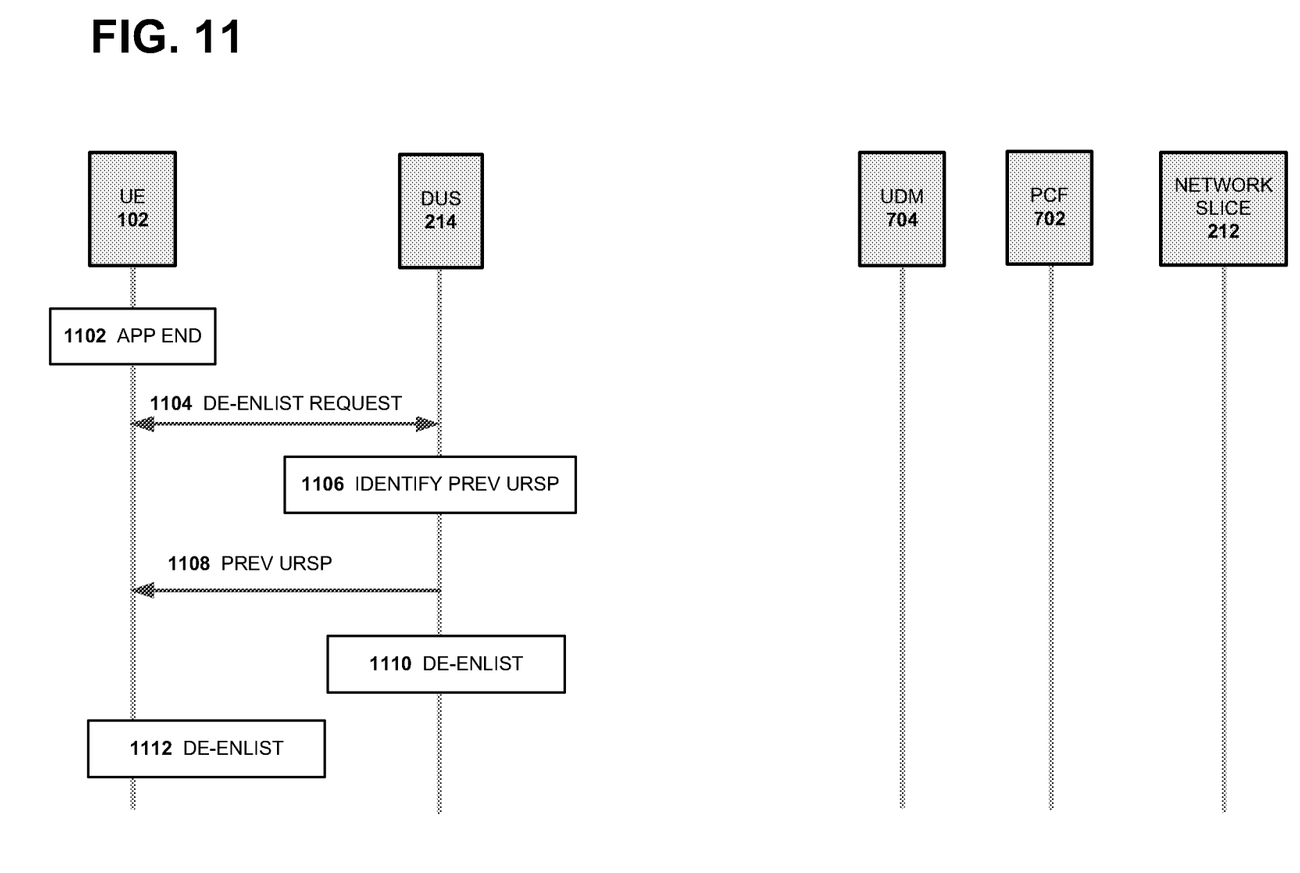
FIG. 11 illustrates example messages that are exchanged by a system for ephemeral assignment of network slices.

FIG. 10 is a flow diagram of an exemplary process 1000 that is associated with ephemeral assignment of network slices and more particularly with de-enlisting application 104 at DUS 214. Process 1000 may be performed by one or more components the system, such as UE 102 (e.g., applications 104, client 304, DUSC DB 306, operating system 308, modem 310, and/or URSP 108), DUS 214, and/or core network 206 (e.g., network functions 702-708). FIG. 11 illustrates exemplary messages that are exchanged by components of the system during process 1000.

As shown, process 1000 may include detecting that application 104 is about to end or its session is about to end (block 1002; arrow 1102). For example, client 304 may determine that application 104 is about to terminate or its session with network slice 212 is about to end. In response, client 304 may send a de-enlistment request to DUS 214 (block 1002; block 1104). The de-enlistment request may include the UE ID, the application ID, and/or the traffic descriptor in the de-enlistment request.

Process 1000 may further include enlistment manager 502 in DUS 214 receiving the de-enlistment request (block 1004). Upon receipt of the de-enlistment request, enlistment manager 502 may use the UE ID and the application ID provided in the de-enlistment request to look up the corresponding record for application 104 in app-URSP binding DB 504. Based on the record, enlistment manager 502 may obtain or identify the previous URSP rule in previous RUSP rule field 612 (block 1006; block 1106).

Process 1000 may further include enlistment manager 502 sending a reply message that includes the previous URSP rule, the URSP rule, the previous traffic descriptor, and/or the replacement traffic descriptor in the record to client 304 (block 1008; block 1108). If the enlistment did not result in a replacement URSP rule in process 800, the record may not include a replacement URSP rule—and in such a case, enlistment manager 502 may send a null rule or nothing to client 304.

At network 106 side, after enlistment manager 502 sends the reply, enlistment manager 502 may complete de-enlistment of application 104 (block 1010; block 1110). This may include enlistment manager 502 deleting data pertaining to application 104 in the record 500 corresponding to the UE 102 hosting application 104. Alternatively, enlistment manager 502 may erase the contents of TD field 606 and URSP field 610 in the record 500, leaving fields 606 and 610 blank.

Similarly, at the UE 102 side, after client 304 receives the reply from enlistment manager 502, client 304 may perform any cleanup tasks associated with de-enlistment of application 104 (block 1010; block 1112). The cleanup may include client 304 using the previous URSP rule and the replacement URSP rule (which may be obtained from the reply or the record for application 104 in DUSC DB 306) to restore URSP 108 to the state prior to the enlistment of application 104 at DUS 214. For example, client 304 may replace the URSP rule in URSP 108 with the previous URSP rule. After restoring the state of URSP 108, client 304 may delete the contents of TD field 406 and URSP field 410 in the record for application 104, leaving fields 406 and 410 blank.

Figure 12:
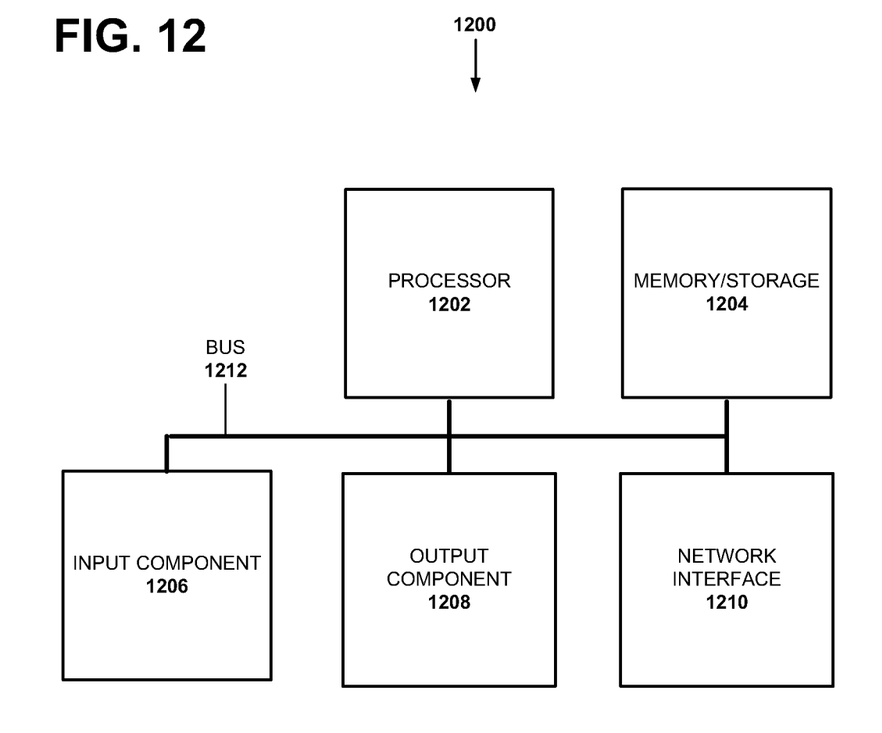
FIG. 12 depicts example functional components of a network device according to an implementation.

FIG. 12 depicts exemplary components of a network device 1200. Network device 1200 may include, correspond to, and/or be included in any of the devices and/or components illustrated in FIGS. 1-3, 5, 7, 9, and 11 (e.g., UE 102, access network 204, core network 206, data network 208, access station 210, DUS 214, and NFs 702-708). In some implementations, network devices 1200 may be part of a hardware network layer on top of which other network layers and network functions (NFs) may be implemented.

As shown, network device 1200 may include a processor 1202, memory/storage 1204, input component 1206, output component 1208, network interface 1210, and communication path 1212. In different implementations, network device 1200 may include additional, fewer, different, or different arrangement of components than the ones illustrated in FIG. 12. For example, network device 1200 may include line cards, switch fabrics, modems, etc.

Processor 1202 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling network device 1200 and/or executing programs/instructions.

Memory/storage 1204 may include static memory, such as read only memory (ROM), and/or dynamic memory, such as random access memory (RAM), or onboard cache, for storing data and machine-readable instructions (e.g., programs, scripts, etc.). Memory/storage 1204 may also include a CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1204 may be external to and/or removable from network device 1200. Memory/storage 1204 may include, for example, a Universal Serial Bus (USB) memory stick, a dongle, a hard disk, off-line storage, a Blu-Ray® disk (BD), etc. Memory/storage 1204 may also include devices that can function both as a RAM-like component or persistent storage, such as Intel® Optane memories. Depending on the context, the term "memory," "storage," "storage device," "storage unit," and/or "medium" may be used interchangeably. For example, a "computer-readable storage device" or "computer-readable medium" may refer to both a memory and/or storage device.

Input component 1206 and output component 1208 may provide input and output from/to a user to/from network device 1200. Input/output components 1206 and 1208 may include a display screen, a keyboard, a mouse, a speaker, a microphone, a camera, a DVD reader, USB lines, and/or other types of components for obtaining, from physical events or phenomena, to and/or from signals that pertain to network device 1200.

Network interface 1210 may include a transceiver (e.g., a transmitter and a receiver) for network device 1210 to communicate with other devices and/or systems. For example, via network interface 1210, network device 1200 may communicate over a network, such as the Internet, an intranet, cellular, a terrestrial wireless network (e.g., a WLAN, WIFI, WIMAX, etc.), a satellite-based network, optical network, etc. Network interface 1210 may include a modem, an Ethernet interface to a LAN, and/or an interface/connection for connecting network device 1200 to other devices (e.g., a Bluetooth interface).

Communication path or bus 1212 may provide an interface through which components of network device 1200 can communicate with one another.

Network device 1200 may perform the operations described herein in response to processor 1202 executing software instructions stored in a non-transient computer-readable medium, such as memory/storage 1204. The software instructions may be read into memory/storage 1204 from another computer-readable medium or from another device via network interface 1210. The software instructions stored in memory/storage 1204, when executed by processor 1202, may cause processor 1202 to perform one or more of the processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while series of actions, messages, and/or signals, have been described with reference to FIGS. 8-11, the order of the actions, messages, and signals may be modified in other implementations. In addition, non-dependent actions, messages, and signals may represent actions, messages, and signals that can be performed, sent, and/or received in parallel and in different orders. Furthermore, each actions, messages, and signals illustrated may include one or more other actions, messages, and/or signals.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a processor to:
send an enlistment request to a network over a wireless connection, wherein the enlistment request includes an application identifier (ID) corresponding to an application to be enlisted;
receive a reply from the network in response to the enlistment request, wherein the reply includes a replacement User Equipment Route Selection Policy (URSP) rule;
receive a session request from the application to establish a session;
identify, in response to the session request and based on the replacement URSP rule, a network slice on the network;
establish the session between the application and the identified network slice on the network; and
restore a database, which is hosted on the device, that includes URSP rules to a state prior to sending the enlistment request to the network, wherein when the processor restores the database, the processor is to: remove the replacement URSP rule from the database; and insert, in the database, a prior URSP rule, if any, that was overwritten by the replacement URSP rule after the processor received the reply from the network.

2. The device of claim 1, wherein the processor is further to:
detect that the application has launched as a trigger to send the enlistment request.

3. The device of claim 1, wherein the processor is further to:
insert the replacement URSP rule in the database by overwriting the prior URSP rule in the database.

4. The device of claim 1, wherein the session request includes a traffic descriptor that indicates a type of network traffic that the application is to send to the network, and wherein the processor is to:
prevent the application from including, in the session request, information that identifies the application.

5. The device of claim 1, wherein the processor is further to:
detect that the application is about to end or that the session has terminated; and
send a de-enlistment request to the network in response to detecting that the application is about to end or that the session has terminated.

6. The device of claim 1, wherein the enlistment request includes a traffic descriptor, and wherein the reply includes a replacement traffic descriptor.

7. A method comprising:
sending, by a device, an enlistment request to a network over a wireless connection, wherein the enlistment request includes an application identifier (ID) corresponding to an application to be enlisted;
receiving a reply from the network in response to the enlistment request, wherein the reply includes a replacement User Equipment Route Selection Policy (URSP) rule;
receiving a session request from the application to establish a session;
identifying, in response to the session request and based on the replacement URSP rule, a network slice on the network;
establishing the session between the application and the identified network slice on the network; and
restoring a database, which is hosted on the device, that includes URSP rules to a state prior to sending the enlistment request to the network, wherein restoring the database to the state prior to sending the enlistment request includes: removing the replacement URSP rule from the database; and inserting, in the database, a prior URSP rule, if any, that was overwritten by the replacement URSP rule after receiving the reply from the network.

8. The method of claim 7, further comprising:
detecting that the application has launched as a trigger to send the enlistment request.

9. The method of claim 7, further comprising:
inserting the replacement URSP rule in the database by overwriting the prior URSP rule in the database.

10. The method of claim 7, wherein the session request includes a traffic descriptor that indicates a type of network traffic that the application is to send to the network, the method further comprising:
preventing the application from including, in the session request, information that identifies the application.

11. The method of claim 7, further comprising:
detecting that the application is about to end or that the session has terminated; and
sending a de-enlistment request to the network in response to detecting that the application is about to end or that the session has terminated.

12. The method of claim 7, wherein the enlistment request includes a traffic descriptor, and wherein the reply includes a replacement traffic descriptor.

13. A non-transitory computer-readable medium comprising processor-executable instructions, which when executed by a processor of included in a device, cause the processor to:
send an enlistment request to a network over a wireless connection, wherein the enlistment request includes an application identifier (ID) corresponding to an application to be enlisted;
receive a reply from the network in response to the enlistment request, wherein the reply includes a replacement User Equipment Route Selection Policy (URSP) rule;
receive a session request from the application to establish a session;
identify, in response to the session request and based on the replacement URSP rule, a network slice on the network;
establish the session between the application and the identified network slice on the network; and
restore a database, which is hosted on the device, that includes URSP rules to a state prior to sending the enlistment request to the network, wherein when the processor restores the database, the processor is to:
remove the replacement URSP rule from the database; and
insert, in the database, a prior URSP rule, if any, that was overwritten by the replacement URSP rule after the processor received the reply from the network.

14. The non-transitory computer-readable medium of claim 13, wherein the processor is further to:
detect that the application has launched as a trigger to send the enlistment request.

15. The non-transitory computer-readable medium of claim 13, wherein the processor is further to:
insert the replacement URSP rule in the database by overwriting the prior URSP rule in the database.

16. The non-transitory computer-readable medium of claim 13, wherein the session request includes a traffic descriptor that indicates a type of network traffic that the application is to send to the network, and wherein the processor is to:
prevent the application from including, in the session request, information that identifies the application.

17. The non-transitory computer-readable medium of claim 13, wherein the enlistment request includes a traffic descriptor, and wherein the reply includes a replacement traffic descriptor.

18. The device of claim 1, wherein the processor is further to:
detect that the application has launched as a trigger to send the enlistment request; and
insert the replacement URSP rule in the database by overwriting the prior URSP rule in the database.

19. The method of claim 7, wherein further comprising:
detecting that the application has launched as a trigger to send the enlistment request; and
inserting the replacement URSP rule in the database by overwriting the prior URSP rule in the database.

20. The non-transitory computer-readable medium of claim 13, wherein the processor is further to:
detect that the application has launched as a trigger to send the enlistment request; and
insert the replacement URSP rule in the database by overwriting the prior URSP rule in the database.

\* \* \* \* \*